(12) United States Patent
Berthalon

(10) Patent No.: US 8,986,127 B2
(45) Date of Patent: Mar. 24, 2015

(54) FLEXIBLE COUPLING MEANS AND A MECHANICAL TRANSMISSION

(71) Applicant: Airbus Helicopters, Marignane, Cedex (FR)

(72) Inventor: Sylvain Berthalon, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/840,467

(22) Filed: Mar. 15, 2013

(65) Prior Publication Data
US 2013/0288809 A1    Oct. 31, 2013

(30) Foreign Application Priority Data

Apr. 27, 2012    (FR) ...................................... 12 01238

(51) Int. Cl.
*F16D 9/06*    (2006.01)
*F16D 3/10*    (2006.01)
(Continued)

(52) U.S. Cl.
CPC .. *F16D 3/10* (2013.01); *F16D 3/72* (2013.01); *F16D 9/10* (2013.01)
USPC ................ 464/32; 464/80; 464/158; 403/349

(58) Field of Classification Search
USPC ..................... 464/30, 79, 80, 98, 99, 158, 32; 403/348, 349
See application file for complete search history.

(56) References Cited

U.S. PATENT DOCUMENTS 765,225 A * 7/1904 Colin ........................ 403/348 X
3,380,564 A    4/1968 Beurer
(Continued)

FOREIGN PATENT DOCUMENTS

CN    102138019 A    7/2011
EP    0026681 A1    4/1981
(Continued)

OTHER PUBLICATIONS

"Mechanical-fasting." Welding-advisors.com. May 14, 2010 [online], [retrieved on Nov. 27, 2013] Retrieved from the Internet <URL: http://web.archive.org/web/20100514160827/http://www.welding-advisers.com/Mechanical-fastening.html >.*
(Continued)

*Primary Examiner* — Gregory Binda
*Assistant Examiner* — Josh Skroupa
(74) *Attorney, Agent, or Firm* — Brooks Kushman P.C.

(57) ABSTRACT

A coupling means (10) provided with a first member (20) suitable for being fastened to a first rotary part (2) and with a second member (30) suitable for being fastened to a second rotary part (3), the first member (20) being provided with a first diaphragm (22) and the second member (30) being provided with a second diaphragm (32) that is secured to the first diaphragm (22). An emergency torque transmission device comprises at least one bayonet system including a protuberance (50) secured to one member (30) and co-operating with an angled groove (60) secured to the other member (20) by being inserted in the angled groove (60) by a thrust-and-rotation movement, in the absence of said breakage said coupling means (10) including both axial clearances in compression (70') and in translation (70") and also circumferential clearance between each protuberance (50) and walls defining the corresponding angled groove (60).

16 Claims, 2 Drawing Sheets

(51) Int. Cl.
*F16D 3/72* (2006.01)
*F16D 9/10* (2006.01)

(56) References Cited

U.S. PATENT DOCUMENTS

| | | | |
|---|---|---|---|
| 4,133,188 A | 1/1979 | Cartwright | |
| 4,265,099 A * | 5/1981 | Johnson et al. | 464/99 |
| 4,276,758 A | 7/1981 | Coman | |
| 4,560,364 A | 12/1985 | Cohen | |
| 4,810,126 A | 3/1989 | Lengel | |
| 5,364,309 A | 11/1994 | Heidrich | |
| 5,407,386 A | 4/1995 | Kish | |
| 5,588,917 A | 12/1996 | D'Erocle | |
| 5,755,622 A * | 5/1998 | Kanki et al. | 464/99 |
| 6,126,359 A * | 10/2000 | Dittrich et al. | 403/349 |
| 2010/0093449 A1 | 4/2010 | Davies | |
| 2011/0280359 A1 * | 11/2011 | Trice | |

FOREIGN PATENT DOCUMENTS

| | | |
|---|---|---|
| EP | 0909870 A1 | 4/1999 |
| GB | 2043207 A | 10/1980 |
| WO | 94/18070 A2 | 8/1994 |
| WO | 2010022862 A1 | 3/2010 |

OTHER PUBLICATIONS

Search Report and Written Opinion; Application No. FR 1201238; dated Jan. 21, 2013.
Office Action for Chinese Patent Application No. 201310118082.5; dated Dec. 22, 2014; 19 pages.

* cited by examiner

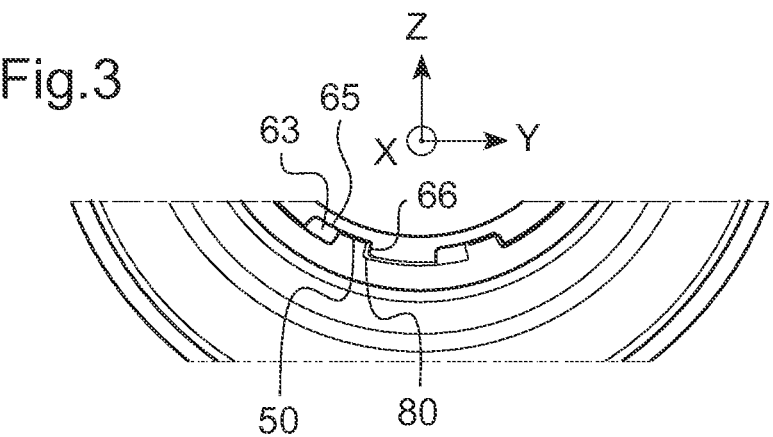
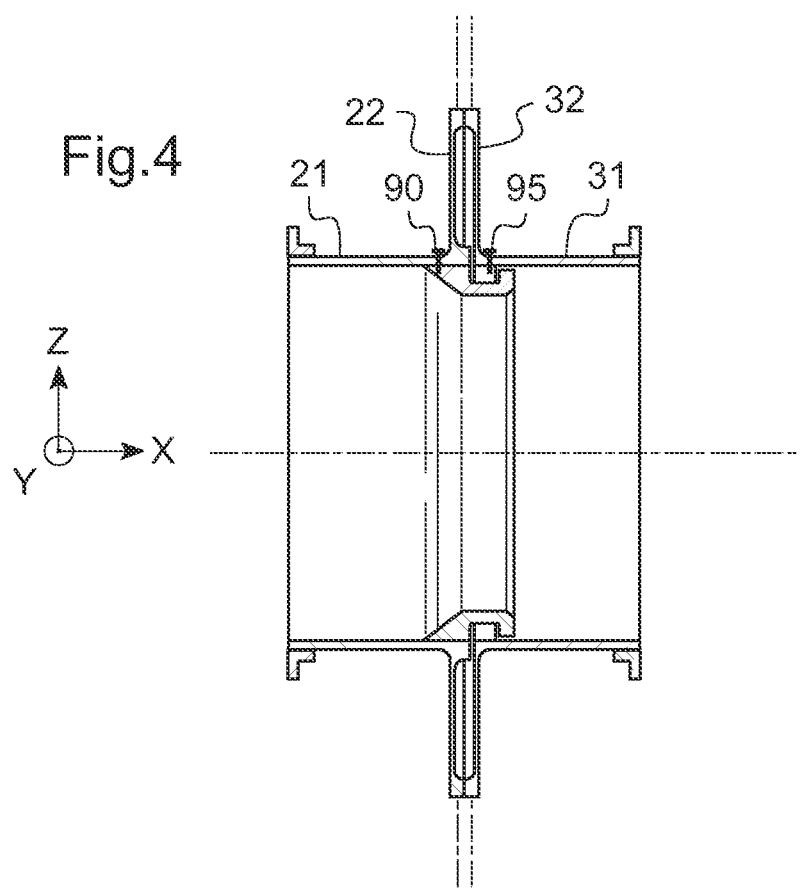

FLEXIBLE COUPLING MEANS AND A MECHANICAL TRANSMISSION

CROSS REFERENCE TO RELATED APPLICATIONS

This application claims priority to French patent application No. FR 12 01238 filed on Apr. 27, 2012, the disclosure of which is incorporated in its entirety by reference herein.

BACKGROUND OF THE INVENTION (1) Field of the Invention

The present invention relates to flexible coupling means that accommodate angular and axial movements while connecting together two rotary mechanical parts. The coupling means may, for example, connect a transmission shaft to a mechanical part such as a rotorcraft turbine engine. The invention also provides a mechanical transmission including the flexible coupling means.

Consequently, the invention lies in the technical field of transmitting power from one mechanical part to another, in particular mechanical parts of a rotorcraft.

(2) Description of Related Art

Most presently-manufactured rotorcraft have at least one turbine engine with a free turbine. Power is then taken from a low pressure stage of the free turbine, which stage is mechanically independent of the compressor assembly and of the high pressure stage of the engine. The free turbine of such an engine generally rotates at a speed in the range 20,000 revolutions per minute (rpm) to 50,000 rpm, so a speed-reducing gearbox is needed for its connection with the main rotor of the rotorcraft, since the speed of rotation of the rotor lies substantially in the range 200 rpm to 400 rpm: this is the main power transmission gearbox, often referred to as the "main gearbox" or by the initials MGB.

Under such conditions, the engine is connected to the MGB of the rotorcraft via at least one transmission shaft rotating about its axis of rotation at a speed that is often faster than 5000 rpm.

Likewise, a rotorcraft may include a tail rotor driven by at least one power transmission shaft in order to control the yaw movement of the rotorcraft.

In general, a transmission shaft needs to be securely fastened by coupling means to the mechanical members that it is to connect together.

Furthermore, those coupling means must enable the transmission shaft to transfer the power developed by one mechanical part to another under conditions that might be extreme, e.g. when the parts that are connected together are not properly in alignment with each other.

Means for coupling a transmission shaft to a mechanical part are then dimensioned to accommodate axial and angular misalignment between the transmission shaft and the mechanical part.

Coupling means are known that accommodate such misalignments, said means being provided with a first annular part and with a second annular part.

Each annular part comprises a flexible annular disk of small thickness extending radially from a base to an outer periphery. The base is secured to fastener means for fastening it to one of the rotary parts, such as a transmission shaft.

Each annular disk is sometimes referred to as a "diaphragm". The term "diaphragm" is therefore used below for convenience.

Under such circumstances, the two annular parts are connected to each other solely via the outer peripheries of their diaphragms. Those outer peripheries may be fastened together by welding, or by using bolts and lock nuts, for example.

Diaphragm coupling means provide a solution that is advantageous in terms of connecting together rotary parts that might be misaligned.

Such diaphragm coupling means possess a relatively high level of reliability because they have few components. Nevertheless, diaphragm coupling means present diaphragms of small thickness that can lead to a certain amount of fragility if ever the nominal axial and angular misalignments that were taken into consideration during a design stage are exceeded.

Document U.S. Pat. No. 4,133,188 proposes flexible diaphragm coupling means seeking to mitigate the effects of said diaphragms breaking.

Those coupling means comprise a pair of diaphragms for transmitting torque between two rotary parts while accommodating axial and angular misalignment between those two parts.

Furthermore, the coupling means include an emergency torque transmission device making use of longitudinal splines.

While the diaphragms are connected together, torque is transmitted between the connected-together parts via the diaphragms.

In contrast, coupling is provided by the emergency device in the event of the diaphragms breaking.

Those coupling means are advantageous. Nevertheless, the coupling means comprise a relatively large number of mechanical components, thereby making manufacture complex.

Documents U.S. Pat. No. 5,407,386 and EP 0 026 681 also describe coupling means having an emergency device with splines.

Document U.S. Pat. No. 4,560,364 describes coupling means provided with a first member fastened to a first rotary part and a second member fastened to a second rotary part. The first member includes a first diaphragm fastened to a second diaphragm of the second member.

Furthermore, the first member is fastened to the first rotary part via a bolt. The bolt has a threaded shank co-operating with the first rotary part, a hexagonal head, and a shoulder arranged between said head and said threaded shank.

The second member also includes a plate for fastening to the second rotary part.

Under such circumstances, the coupling means are provided with an insert that co-operates with said shoulder. The insert is fastened by a disk that is interposed between the fastener plate of the second member and the second rotary part.

The shoulder has two projections representing male splines that co-operate with corresponding female splines in the insert.

Document U.S. Pat. No. 5,588,917 describes connection means having two torque transmission paths, one of the paths including splines.

Document US 2010/0093449 relates to diaphragm coupling means having means for limiting axial misalignment.

Document WO 2010/022862 is remote from the technical field of the invention. That document WO 2010/022862 describes coupling means for connecting together two shafts via an axial compensation element that accommodates an axial, angular, or lateral offset between said shafts.

In order to prevent damaging the compensation element as a result of high axial loads in traction while dismantling the coupling means, the coupling means include one or more abutments. Those abutments act axially in order to avoid damaging the compensation element under the effect of excessive axial traction.

In operation, pressure means apply an axial load to make the abutments inoperative.

Also known are documents U.S. Pat. No. 5,364,309 and GB 2 043 207.

BRIEF SUMMARY OF THE INVENTION

An object of the present invention is thus to provide flexible coupling means capable of accommodating an axial and radial misalignment between two rotary parts. The coupling means seek to minimize the risk of torque transmission between said rotary parts being interrupted as a result of a diaphragm breaking or of the connection between two diaphragms breaking, while nevertheless presenting a structure that is relatively simple.

According to the invention, axial coupling means are provided with a first member suitable for being fastened to a first rotary part and with a second member suitable for being fastened to a second rotary part. The first member is provided with a first diaphragm and the second member is provided with a second diaphragm that is secured to the first diaphragm in order to allow an axial and/or angular and/or lateral offset between the rotary parts.

The diaphragms may be of known type. The first outer periphery of the first diaphragm may be secured to the second outer periphery of the second diaphragm by a fastener system. Such a fastener system may comprise welding means or indeed bolting means.

The coupling member also include a torque-transmission emergency device for connecting the first rotary part to the second rotary part in the event of at least one diaphragm or a connection between the diaphragms breaking.

The coupling means are remarkable in particular in that the emergency device comprises at least one bayonet system including a protuberance secured to one member and co-operating with an angled groove secured to the other member by being inserted in the angled groove by a thrust-and-rotation movement. In addition, in the absence of said breakage of a diaphragm or a connection between the diaphragms, the coupling means include axial clearance in compression, axial clearance in traction, and circumferential clearance between each protuberance and walls defining the corresponding angled groove. It should be observed that the circumferential clearance may also be referred to as angular clearance.

If a diaphragm or the connection between the diaphragms breaks, the torque transmission device enables that break to be mitigated by continuing to transmit motion and torque between the first member and the second member.

The protuberance comes into contact with the walls defining the angled groove so as to enable one of the members to be driven in rotation by the other member. The circumferential clearance is then naturally taken up so as to make such drive possible. Likewise, the axial spacing between the members is restricted to the axial clearances.

Furthermore, such an emergency device does not interfere with operation of the coupling means under normal conditions, i.e. in the absence of a break of a diaphragm or of the connection between the diaphragms.

The axial clearances, the circumferential clearance, and the flexibility of the diaphragms accommodate an axial and a radial offset between the first member and the second member.

Such an emergency device also presents the advantage of protecting the diaphragms in the event of being stressed more than normally. The emergency device then acts as an abutment against applied stress.

Furthermore, the coupling means are simple insofar as the coupling means need have no more than two mechanical parts, namely the first member and the second member.

The coupling means may also include one or more of the following additional characteristics.

For example, emergency device may include a plurality of bayonet systems. This characteristic makes it possible to share the torque to be transmitted in the event of the diaphragms failing.

All of the protuberances may optionally be secured to the same member with all of the angled grooves being secured to the other member. This configuration presents in particular the advantage of simplifying the structure of the coupling means.

Furthermore, each member comprises a body secured to a base of a diaphragm, with one of the bodies being provided with at least one protuberance and the other body optionally being provided with at least one angled groove.

Such a body may be a cylindrical body. Such a body represents interface means that are simple and arranged between a rotary part and a diaphragm, and also between the rotary part and a part of the emergency device.

Preferably, the coupling means include longitudinal clearance between the bodies to accommodate an axial and a radial offset between the bodies. The bodies therefore do not interfere with the operation of the coupling means.

In another aspect, at least one protuberance is situated in a plane defined by a diaphragm of the member having the protuberance.

At least one angled groove of a member projects from a plane defined by the diaphragm of a member in order to penetrate into the inside of the other member, in order to co-operate with a protuberance.

Furthermore, each angled groove may be L-shaped and present a longitudinal slot followed by a circumferential slot, a protuberance penetrating into the longitudinal slot by a thrust movement and then into the circumferential slot by a rotary movement.

In a preferred embodiment, the coupling means comprise:
a first member having a first hollow cylindrical body extending axially, a first base of a first diaphragm being secured to the first body;
a second member having a second hollow cylindrical body extending axially, a second base of a second diaphragm being secured to the second body, a second outer periphery of the second diaphragm being fastened to a first outer periphery of the first diaphragm;
a plurality of protuberances secured to the second body, each protuberance projecting into an inside space of said second body; and
one angled groove per protuberance, each groove being secured to said first body and projecting into said inside space, each protuberance being arranged in an angled groove in order to connect the first member in particular angularly to the second member in the event of a diaphragm breaking.

In addition, the coupling means may comprise a first releasable fastener device for fastening a protuberance to one of the members, and a second releasable fastener device for fastening an angled groove to one of the members.

The emergency device is then removable. Furthermore, the emergency device may be arranged on existing coupling means.

In addition to flexible coupling means, the invention provides a rotary mechanical transmission that is provided with a first rotary part and a secondary rotary part.

The mechanical transmission includes coupling means of the above-described type.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 3 is a fragmentary cross-section of coupling means in a first variant; and

FIG. 4 is a longitudinal section of coupling means in a second variant.

Elements present in more than one of the figures are given the same references in each of them.

DETAILED DESCRIPTION OF THE INVENTION

It should be observed that three mutually orthogonal directions X, Y, and Z are marked in some of the figures.

The first direction X is said to be "longitudinal". The terms "longitudinal" and "axial" relate to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

Figure 1:
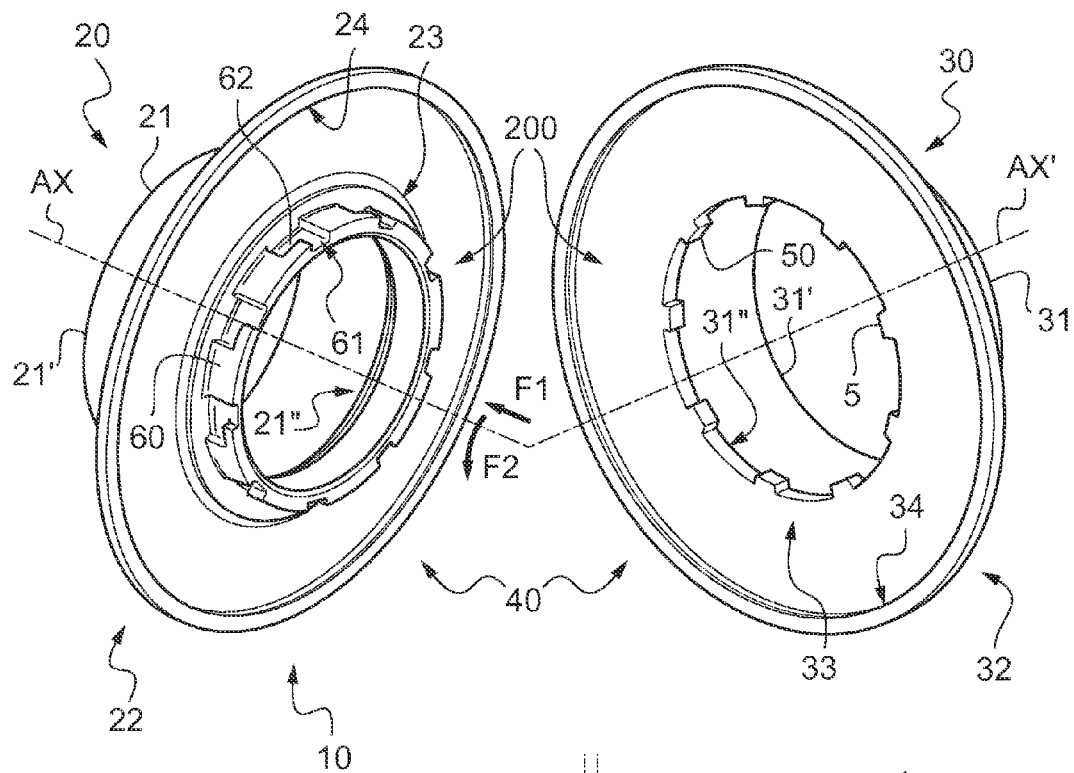
FIG. 1 is an exploded view of coupling means.

FIG. 1 shows coupling means 10 for mechanically coupling together two rotary parts while allowing axial, angular, and lateral offsets between those rotary parts.

Under such circumstances, the coupling means 10 comprise a first member 20 having a first diaphragm 22.

More precisely, the first member 20 has a first hollow cylindrical body 21. This first body 21 extends longitudinally from a first distal end 21' to a first proximal end 21" along a first axis of rotation AX.

A first annular base 23 of the first diaphragm 22 is then secured to the first proximal end 21". For example, this annular base is welded to the first proximal end 21".

The first diaphragm is then annular in shape, extending radially from its first annular base 23 to an outer periphery 24.

Furthermore, the first distal end 21' of the first body may include first fastener means, not shown in FIG. 1. The first fastener means then serve to secure the first member 20 to a first rotary part.

The coupling means 10 also comprise a second member 30 having a second diaphragm 32.

The second member 30 that is shown has a second hollow cylindrical body 31. This second body 31 extends longitudinally from a second distal end 31' to a second proximal end 31" along a second axis of rotation AX'.

A second annular base 33 of the second diaphragm 32 is then secured to the second proximal end 31". For example, this annular base is welded to the second proximal end 31".

The second diaphragm is then annular in shape, extending radially from its second annular base 33 to an outer periphery 34.

Furthermore, the second distal end 34 of the second body 30 may include second fastener means, not shown in FIG. 1. The second fastener means then serve to secure the second member 30 to a second rotary part.

Under such circumstances, the coupling means is provided with a fastener system for connecting the first distal end 24 to the second distal end 34.

The fastener system may include a bead of welding or possibly a plurality of bolts, for example.

The flexibility of the diaphragms enable the coupling mechanism to accommodate an offset that may be axial, angular, or indeed lateral between the first and second members, and consequently between the two rotary parts.

Furthermore, the coupling means 10 include an emergency device 40 for enabling one of the members to be driven by the other member in the event of the mechanical connection that includes the diaphragms and the fastener system failing.

The emergency device 40 includes at least one bayonet system 200.

Each bayonet system 200 is provided firstly with a protuberance 50 secured to one of the members, e.g. a stud, and secondly an angled groove 60 secured to the other member. A protuberance is then inserted in an angled groove by a movement that associated a thrust F1 followed by a rotation F2.

Such an angled groove may possibly be L-shaped. Each angled groove can thus present a longitudinal slot 61 parallel to the axis of rotation of the associated member, followed by a circumferential slot 62.

By way of example, prior to securing the diaphragms, an operator inserts each protuberance 50 into an angled groove 60, and then the operator positions one of the members relative to the other member by performing the above thrust and rotation movements. Each protuberance 50 is then moved in a longitudinal slot 61 by a thrust movement in translation F1 and then in a circumferential slot 62 by a rotary movement F2.

Thereafter, the operator secures the diaphragms to each other in order to finish assembling the coupling means.

Furthermore, the emergency device 40 may include at least two identical bayonet systems 200, and in particular nine bayonet systems 200 in the example shown.

Consequently, all of the protuberances 50 may be identical and secured to one of the members and all of the angled grooves may be identical and secured to the other member. This simplifies the coupling means themselves and also arranging one of the members relative to the other.

Figure 2:
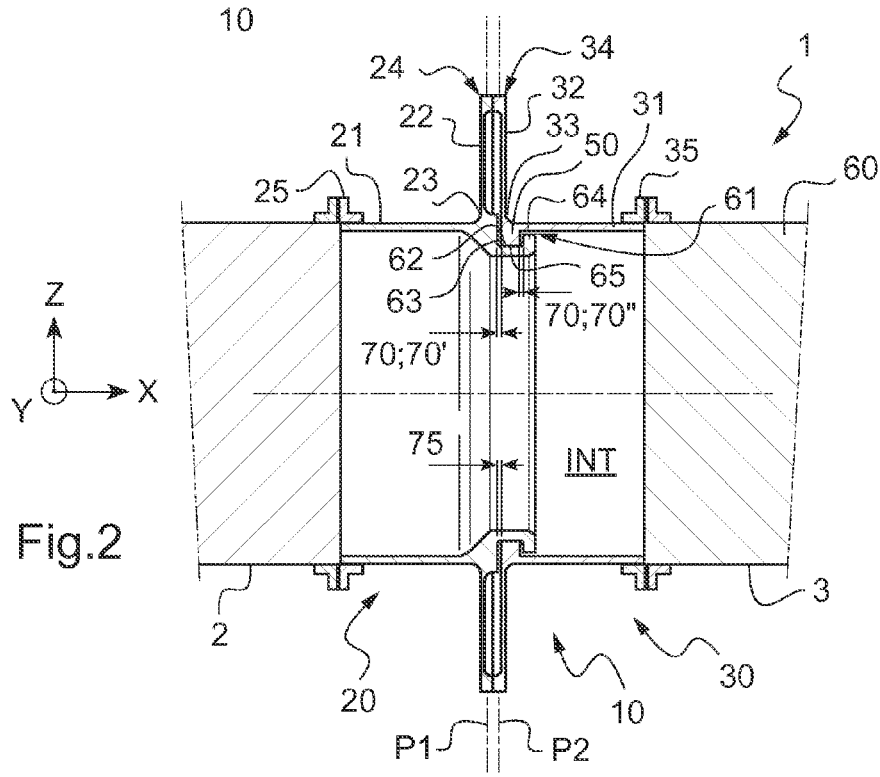
FIG. 2 is a longitudinal section of coupling means in a first variant.

FIG. 2 shows coupling means 10 that are assembled within a mechanical transmission 1.

The mechanical transmission 1 thus includes a first rotary part 2 secured to a first body 21 of a first member 20 via first fastener means 25. The mechanical transmission 1 also possesses a second rotary part 3 secured to a second body 31 of a second member 30 by second fastener means 35.

Once the coupling means 10 are assembled, the first diaphragm 22 of the first member 20 is fastened to the second diaphragm 32 of the second member 30. For this purpose, it is possible to use electron beam welding, for example.

In addition, each protuberance 50 is arranged in a circumferential slot 62 of an angled groove 50.

FIG. 2 shows an embodiment that involves arranging each protuberance in a plane P2 defined by a diaphragm 32. Specifically, each protuberance 50 projects from the second proximal end 31" towards the inside INT of the second body. Each protuberance may then represent an extension of the second diaphragm projecting into the inside of the second body.

Conversely, each angled groove projects in a plane P1 defined by the diaphragm 22 of a member 20 so as to enter into the inside INT of the other member 30. Specifically, each angled groove is arranged in a cylinder secured to the first body 21, the cylinder extending from the first proximal end 21' of the first body into the inside INT of the second body 31 in order to co-operate with said protuberances 50.

In order to allow an offset between the first rotary part 2 and the second rotary part in the absence of a diaphragm or the diaphragm fastener system breaking, the coupling means 10 include two axial clearances 70 and one circumferential clearance 80 between each protuberance 50 and walls 63, 64 defining the corresponding angled groove 60.

The circumferential slot is defined axially, i.e. in a direction parallel to the axis of rotation of the member having the groove, by a proximal wall 63 and by a distal wall 64. The proximal wall 63 is then closer to the second diaphragm than is the distal wall 64. In other words, the proximal wall 63 may be outside the second body 31 while the distal wall is present in the inside INT of the second body.

The proximal wall 63 and the distal wall 64 are mutually parallel, and they are parallel to the first plane P1 and to the second plane P2 containing the diaphragms.

First axial clearance 70' then separates a protuberance from the proximal wall 63, second axial clearance 70" then separating the protuberance from the distal wall 64. The first axial clearance then corresponds to the maximum acceptable axial deformation for the coupling means in compression, while the second clearance corresponds to the maximum acceptable axial deformation for the coupling means in traction.

In contrast, the protuberance may rest on a bottom 65 of the circumferential groove, or may at least present no more than manufacturing clearance relative thereto.

With reference to FIG. 3, the circumferential groove is defined circumferentially by a "radial" wall 66 that is substantially orthogonal to the proximal wall 63 and to the distal wall 64.

Circumferential clearance 80 then separates a protuberance from the radial wall 66.

In addition, longitudinal clearance 75 is present between the first body 21 and the second body 31 in zones that do not have a bayonet system.

If a diaphragm or the connection between the diaphragms breaks, the coupling means remain effective regardless of the direction of rotation of the members. The L-shape of the angled grooves serves to retain all of the advantages of the emergency device.

In a first direction of rotation, each protuberance moves in a circumferential groove in order to reach a radial wall 66, thereby taking up the circumferential clearance.

In a second direction of rotation, each protuberance travels along the entire length of the circumferential groove and then comes into abutment against the end of the circumferential groove that is opposite from the radial wall 66.

In another aspect, each bayonet system may be permanent or removable.

For example, in the first variant of FIG. 2, each protuberance is fastened in non-removable manner to a body, and each groove is also fastened in non-removable manner to a body.

In contrast, in the second variant of FIG. 4, the coupling means 10 include a first releasable fastener device 95 for fastening a protuberance 50 to one of the members 30, and a second releasable fastener device 90 for fastening an angled groove 60 to one of the members 20.

For example, the protuberances are secured to a ring that is fastened by conventional releasable means to the second body, e.g. means possibly making use of screw fasteners.

Likewise, the angled grooves may be formed in a cylinder fastened by conventional reversible means to the first body.

The coupling means may optionally include two identical removable means each having at least one pair of protuberances and at least one pair of angled grooves. One of the removable means are then fastened by a first fastener device to one of the members and the other removable means are then fastened by a second fastener device to the other member.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A coupling means comprising:
a first member suitable for being fastened to a first rotary part and with a second member suitable for being fastened to a second rotary part, the first member being provided with a first diaphragm and the second member being provided with a second diaphragm that is secured to the first diaphragm in order to allow an axial and/or angular and/or lateral offset between the rotary parts, the coupling means including a torque-transmission emergency device for connecting the first rotary part to the second rotary part in the event of at least one diaphragm or a connection between the diaphragms breaking, wherein the emergency device includes at least one bayonet system including a protuberance secured to one of the first and second member and co-operating with an angled groove secured to the other of the first and second member by being inserted in the angled groove by a thrust movement and a rotation movement, in the absence of the connection breaking, the coupling means maintain both axial clearance in compression together with axial clearance in traction and also circumferential clearance between each protuberance and walls defining the corresponding angled groove,
wherein each angled groove is L-shaped and includes a longitudinal slot followed by a circumferential slot, the protuberance being inserted into the longitudinal slot first by the thrust movement and then into the circumferential slot by the rotary movement.

2. The coupling means according to claim 1, wherein the emergency device includes a plurality of bayonet systems, with all of the protuberances being secured to the same member and all of the angled grooves being secured to the same member.

3. The coupling means according to claim 1, wherein each member comprises a body secured to a base of a diaphragm, with one of the bodies being provided with at least one protuberance and the other body being provided with at least one angled groove.

4. The coupling means according to claim 3, wherein the coupling means include longitudinal clearance between the first body and the second body.

5. The coupling means according to claim 1, wherein the protuberance extends in a plane defined by at least one of the first and second diaphragms.

6. The coupling means according to claim 1, wherein at least one angled groove of a member projects from a plane defined by the diaphragm of that member in order to penetrate into the inside of the other member.

7. The coupling means according to claim 1, wherein the coupling means comprise a first releasable fastener device for fastening a protuberance to one of the members, and a second releasable fastener device for fastening an angled groove to one of the members.

8. The coupling means according to claim 1, wherein the coupling means further comprises:
- the first member having a first hollow cylindrical body extending axially, a first base of the first diaphragm being secured to the first body;
- the second member having a second hollow cylindrical body extending axially, a second base of the second diaphragm being secured to the second body, a second outer periphery of the second diaphragm being fastened to a first outer periphery of the first diaphragm;
- a plurality of protuberances secured to the second body, each protuberance projecting into an inside space (of the second body; and
- a plurality of angled grooves, wherein one angled groove corresponds to each of the protuberance, each angled groove being secured to the first body and projecting into the inside space (INT), each protuberance being arranged in an angled groove in order to connect the first member angularly to the second member in the event of a diaphragm breaking.

9. A rotary mechanical transmission having a first rotary part and a second rotary part, wherein the mechanical transmission includes the coupling means according to claim 1.

10. A coupling for accommodating axial and radial alignment variations between two rotary parts, the coupling comprising:
- a first coupling member provided with a first diaphragm and connected to a first rotary part;
- a second coupling member provided with a second diaphragm and connected to a second rotary part, wherein the first and second diaphragms are secured together to provide a connection allowing axial and/or angular and/or lateral offset between the first and second rotary parts; and
- a back-up torque-transmission emergency device for connecting the first rotary part to the second rotary in the event of a failure of the connection provided by the first and second diaphragms, wherein the emergency device includes:
  - a protuberance extending from the first coupling member; and
  - an angled groove disposed on the second coupling member for co-operating with the protuberance, wherein the angled groove is sized to provide axial and angular clearance when the protuberance is inserted in the angled groove,
  - wherein the protuberance is inserted in the angled groove by a thrust movement and a rotation movement so that the protuberance is contained within the groove and is prevented from being removed from the groove in an axial direction,
- wherein the back-up torque-transmission emergency device secures the first and second rotary parts together in the axial direction while allowing both axial clearance in compression together with axial clearance in traction and also angular clearance between each of the first and second rotary parts.

11. The coupling according to claim 10, wherein each angled groove is L-shaped and includes a longitudinal slot followed by a circumferential slot, the protuberance being inserted into the longitudinal slot first by the thrust movement and then into the circumferential slot by the rotary movement.

12. The coupling according to claim 10, wherein:
- the first coupling member includes a first hollow cylindrical body;
- the second coupling member includes a second hollow cylindrical body;
- the first and second diaphragms positioned around the first and second cylindrical bodies and extending radially outward from, the first and second diaphragms fastened together along a respective outer periphery,
- the protuberances extending radially inward from the first hollow cylindrical body;
- the angled groove formed on a radial surface of the second hollow cylindrical body and oriented to engage the inward extending protuberance when the first and second rotary parts are connected.

13. The coupling according to claim 12, further comprising:
- a plurality of protuberances extending radially inward and spaced apart along a circumference of the first hollow cylindrical body;
- a plurality of angled grooves formed on the radial surface of the second hollow cylindrical body and oriented and spaced apart along a circumference of the second hollow cylindrical body wherein one of the protuberances engages one of the angled grooves when the first and second rotary parts are connected.

14. A coupling member for accommodating axial and radial alignment variations between two rotary parts, the coupling member comprising:
- a first rotary part provided having a first diaphragm;
- a second rotary part provided having a second diaphragm, wherein the first and second diaphragms are secured together and provide a connection allowing axial and/or angular and/or lateral offset between the first and second rotary parts; and
- a back-up torque-transmission emergency device for connecting the first rotary part to the second rotary, wherein the emergency device includes:
  - a protuberance extending from one of the first and second rotary parts; and
  - a L-shaped angled groove disposed on the other of the first and second rotary parts for co-operating with the protuberance, wherein the L-shaped angled groove is defined by a longitudinal slot connected to a circumferential slot,
  - wherein the protuberance is inserted in the L-shaped angled groove first by a thrust movement in a longitudinal direction that inserts the protuberance into the longitudinal slot, and second by a rotational movement that moves the protuberance into the circumferential slot so that the protuberance is contained within the circumferential slot and is prevented from being removed from the groove in an axial direction, thereby providing a back-up connection in the event of a failure of the connection provided by the first and second diaphragms,
  - wherein during normal operation of the first and second diaphragms, the L-shaped angled groove is sized to provide axial and angular clearance with the protuberance so that the diaphragms maintain the axial and/or angular and/or lateral offset between the first and second rotary parts.

15. The coupling member according to claim 14, wherein:
- the first rotary part includes a first hollow cylindrical body;
- the second rotary part includes a second hollow cylindrical body;
- the first and second diaphragms positioned around the first and second cylindrical bodies and extending radially outward from, the first and second diaphragms fastened together along a respective outer periphery,
- the protuberance extending radially inward from the first hollow cylindrical body;

the angled groove formed on a radial surface of the second hollow cylindrical body and oriented to engage the inward extending protuberance when the first and second rotary parts are connected.

16. The coupling member according to claim 15, further comprising:
a plurality of protuberances extending radially inward and spaced apart along a circumference of the first hollow cylindrical body;
a plurality of L-shaped angled grooves formed on the radial surface of the second hollow cylindrical body and oriented and spaced apart along a circumference of the second hollow cylindrical body wherein one of the protuberances engages one of the L-shaped angled grooves when the first and second rotary parts are connected.

* * * * *